(12) United States Patent
Karazi

(10) Patent No.: US 8,406,464 B2
(45) Date of Patent: Mar. 26, 2013

(54) SYSTEM AND METHOD FOR TRACKING MOVING OBJECTS

(75) Inventor: Uri Karazi, Nof Ayalon (IL)

(73) Assignee: Israel Aerospace Industries Ltd., Lod (IL)

( * ) Notice: Subject to any disclaimer, the term of this patent is extended or adjusted under 35 U.S.C. 154(b) by 1255 days.

(21) Appl. No.: 11/993,904

(22) PCT Filed: Jun. 22, 2006

(86) PCT No.: PCT/IL2006/000737
§ 371 (c)(1),
(2), (4) Date: Jul. 10, 2008

(87) PCT Pub. No.: WO2006/137071
PCT Pub. Date: Dec. 28, 2006

(65) Prior Publication Data
US 2008/0267451 A1 Oct. 30, 2008

(30) Foreign Application Priority Data

| Jun. 23, 2005 | (IL) | 169345 |
| Jun. 23, 2005 | (IL) | 169346 |
| Jun. 23, 2005 | (IL) | 169347 |

(51) Int. Cl.
G06K 9/00 (2006.01)
H04N 5/225 (2006.01)
(52) U.S. Cl. .......... 382/103; 348/169
(58) Field of Classification Search .......... 382/103, 382/168; 340/541; 348/143, 169, 699
See application file for complete search history.

(56) References Cited

U.S. PATENT DOCUMENTS

| 4,162,775 A | 7/1979 | Voles |
| 4,405,940 A | 9/1983 | Woolfson et al. |

(Continued)

FOREIGN PATENT DOCUMENTS

| EP | 0 423 984 A2 | 4/1991 |
| WO | 00/46985 A1 | 8/2000 |

OTHER PUBLICATIONS

James R. Cloutier, U. S. Statutory Invention Registration No. US H1980 H, "Adaptive Matched Augmented Propotional Navigation", published Aug. 7, 2001.

(Continued)

Primary Examiner — Amara Abdi
(74) Attorney, Agent, or Firm — Browdy and Neimark, P.L.L.C.

(57) ABSTRACT

A method for tracking an object that is embedded within images of a scene, including: in a sensor unit that includes movable sensor, generating, storing and transmitting over a communication link a succession of images of a scene. In a remote control unit, receiving the succession of images. Receiving a user command for selecting an object of interest in a given image of the received succession of images and determining object data associated with the object and transmitting through the link to the sensor unit the object data. In the sensor unit, identifying the given image of the stored succession of images and the object of interest using the object data, and tracking the object in other image of the stored succession of images. The other image being later than the given image. In the case that the object cannot be located in the latest image of the stored succession of images, using information of at images in which the object was located to predict estimated real-time location of the object and generating direction command to the movable sensor for generating realtime image of the scene and locking on the object.

18 Claims, 10 Drawing Sheets

U.S. PATENT DOCUMENTS

| | | |
|---|---|---|
| 4,409,661 A | 10/1983 | Romanski |
| 4,537,370 A | 8/1985 | Pizzurro |
| 4,710,813 A | 12/1987 | Wallis et al. |
| 4,739,401 A | 4/1988 | Sacks et al. |
| 4,805,018 A | 2/1989 | Nishimura et al. |
| 4,843,568 A | 6/1989 | Krueger et al. |
| 4,868,871 A | 9/1989 | Watson, III |
| 4,898,341 A | 2/1990 | Terzian |
| 4,925,274 A | 5/1990 | James et al. |
| 4,959,714 A | 9/1990 | Lo et al. |
| 4,975,960 A | 12/1990 | Petajan |
| 4,996,592 A | 2/1991 | Yoshida |
| 5,036,474 A | 7/1991 | Bhanu et al. |
| 5,062,056 A | 10/1991 | Lo et al. |
| 5,103,484 A | 4/1992 | Stafford et al. |
| 5,119,190 A | 6/1992 | Lemelson |
| 5,149,980 A | 9/1992 | Ertel et al. |
| 5,216,408 A | 6/1993 | Shirakawa |
| 5,275,354 A | 1/1994 | Minor et al. |
| 5,280,530 A | 1/1994 | Trew et al. |
| 5,317,319 A | 5/1994 | Fagarasan et al. |
| 5,323,470 A | 6/1994 | Kara et al. |
| 5,340,309 A | 8/1994 | Robertson |
| 5,341,143 A | 8/1994 | Reis et al. |
| 5,355,325 A | 10/1994 | Uhlmann |
| 5,365,236 A | 11/1994 | Fagarasan et al. |
| 5,371,536 A | 12/1994 | Yamaguchi |
| 5,390,133 A | 2/1995 | Sohie |
| 5,392,225 A | 2/1995 | Ward |
| 5,406,328 A | 4/1995 | Chodos et al. |
| 5,422,829 A | 6/1995 | Pollock |
| 5,424,823 A | 6/1995 | Nettles et al. |
| 5,434,617 A | 7/1995 | Bianchi |
| 5,450,503 A | 9/1995 | Ogino et al. |
| 5,557,685 A | 9/1996 | Schlossers et al. |
| 5,564,650 A | 10/1996 | Tucker et al. |
| 5,574,498 A | 11/1996 | Sakamoto et al. |
| 5,602,760 A | 2/1997 | Chacon et al. |
| 5,626,311 A | 5/1997 | Smith et al. |
| 5,647,015 A | 7/1997 | Choate et al. |
| 5,714,999 A | 2/1998 | Jeong et al. |
| 5,785,275 A | 7/1998 | Hiebl |
| 5,870,486 A | 2/1999 | Choate et al. |
| 5,940,830 A | 8/1999 | Ochitani |
| 5,949,481 A | 9/1999 | Sekine et al. |
| 5,990,822 A | 11/1999 | Honigsbaum |
| 6,044,166 A | 3/2000 | Bassman et al. |
| 6,061,055 A | 5/2000 | Marks |
| 6,064,332 A | 5/2000 | Cloutier |
| 6,079,862 A | 6/2000 | Kawashima et al. |
| 6,088,060 A | 7/2000 | Suda et al. |
| 6,122,405 A | 9/2000 | Khani |
| 6,154,559 A | 11/2000 | Beardsley |
| 6,199,471 B1 | 3/2001 | Perruzzi et al. |
| 6,208,758 B1 | 3/2001 | Ono et al. |
| 6,271,752 B1 * | 8/2001 | Vaios .................. 340/541 |
| 6,272,484 B1 | 8/2001 | Martin et al. |
| 6,404,937 B1 | 6/2002 | Agata et al. |
| 6,445,832 B1 | 9/2002 | Lee et al. |
| 6,449,019 B1 | 9/2002 | Fincher et al. |
| 6,507,366 B1 | 1/2003 | Lee |
| 6,515,689 B1 | 2/2003 | Terashima |
| 6,624,846 B1 | 9/2003 | Lassiter |
| 6,681,061 B2 | 1/2004 | Agata et al. |
| 6,724,915 B1 * | 4/2004 | Toklu et al. ............ 382/103 |
| 6,728,404 B1 | 4/2004 | Ono et al. |
| 6,757,328 B1 | 6/2004 | Huang et al. |
| 6,778,171 B1 | 8/2004 | Kikinis |
| 7,184,574 B1 * | 2/2007 | Zahavi .................. 382/103 |
| 2002/0080159 A1 * | 6/2002 | Montgomery et al. ....... 345/704 |
| 2003/0051597 A1 * | 3/2003 | O'Dwyer ............... 89/1.11 |
| 2004/0156561 A1 * | 8/2004 | Yu-Chuan et al. .......... 382/298 |
| 2005/0119801 A1 | 6/2005 | Florentin et al. |

OTHER PUBLICATIONS

N. F. Powell et al., U. S. Statutory Invention Registration No. US H741, "Discrete Complex Corelation Device for Obtaining Subpixel Accuracy", published Feb. 6, 1990.

* cited by examiner

SYSTEM AND METHOD FOR TRACKING MOVING OBJECTS

FIELD OF THE INVENTION

This invention relates to a method and system for tracking moving objects.

BACKGROUND OF THE INVENTION

In many applications, an operator controls a remote image sensor via a communication link. Examples are traffic control, border control, search and rescue operations, land surveys, police surveillance, military applications, etc. Operators may additionally request measurements of the remote tracked object, such as motion parameter measurements and the like.

Reference is now made to FIG. 1, which illustrates a prior art surveillance/tracking system referred to in WO 00/46985, entitled "Delayed Video Tracking". Note that the following description of FIG. 1 is taken from the '985 publication and has not been amended to cope with inaccuracies except for only a few minor modifications.

Thus, as disclosed in FIG. 1 system 10 comprises a remote image-sensing unit 20 and a control center 22, which are connected via a communication link 25.

Sensing unit 20 comprises a sensor communication unit 28, a remote tracker 30, an image sensor 32, and a pointer control unit 34. The methods of operation for these elements are well known in the art. Sensing unit 20 locates and tracks a sighted object, and transfers sensor data 24, such as image pictures, track location, pointing data and the like, to control center 22. Sensor data 24 travels in the direction represented by arrow A.

Control center 22 comprises a control communication unit 36, a display 38 and a control stick 40. The methods of operation for these elements are also well known in the art. Control center 22 provides control data 26, such as pointing instructions, centering instructions, track commands, track corrections and the like, to sensing unit 20. Control data 26 travels in the direction represented by arrow B.

Communication link 25 is connectable to sensing unit 20 and control center 22 via sensor communication unit 28 and control communication unit 36, respectively. Furthermore, communication link 25 transfers sensor data 24 and control data 26, via sensor communication unit 28 and control communication unit 36, respectively.

Generally, image sensor 32 surveys an object, and relays image pictures (sensor data 24) to display 38, which displays the pictures for viewing by an operator 42.

If operator 42 decides that it is desirable to track the object, he sends via stick 40 manual coarse pointing instructions (control data 26), such as "move up", "move right", "zoom" and the like, to pointer control unit 34. Pointer control unit 34 acts upon these instructions, and directs image sensor 32 in the instructed 15 direction.

Operator 42 then sends via stick 40 centering instructions to pointer control unit 34. Pointer control unit 34 directs image sensor 32 in the instructed direction, thus centering the object in the center of the Field of View (FOV) of display 38. Once the object as sensed by imaging sensor 32 is centered in the FOV, operator 42 electronically sends via stick 40 locking instructions to remote tracker 30. Remote tracker 30 receives the instructions and attempts to lock onto the object in the center of the FOV of display 38.

Once the object has been locked, remote tracker 30 takes over command and generation of the tracking operation. Pointer control unit 34 ceases to receive commands via stick 40 and instead commences to receive instructions from tracker 30. Upon receipt of the instructions, pointer control unit 34 relays them to the image sensor 32. Image sensor 32 tracks the moving object and keeps the object in the center of FOV of display 38, even while the object moves relative to sensing unit 20.

In many applications, there is a considerable time delay between the time when sensing unit 20 acquires an image picture of an object, to when the image is displayed on display 38, and finally, to the receipt of the responding instructions by sensing unit 20. Generally, the main factors contributing to the delay are signal processing, image compression/decompression, duration of the communication, and/or link bandwidth limitations. Consequently, when taking into account the delayed reaction time of the operator, the accumulated delayed time can be from fractions of a second to several seconds.

Due to the time delay, the location of the image as displayed on display 38 is generally not the current location of the object. The location displayed on the screen is the location of the object before the transfer of the sensor data 24, (e.g. A seconds ago). Additionally, by the time the pointer control unit 34 receives the instructions (control data 26) additional time has lapsed, (e.g. an additional B seconds). Subsequently, by the time image sensor 32 is instructed to locate the object, the object may no longer be in the same location it was when the image picture was taken over A+B seconds ago.

Clearly, this time delay complicates the efforts to lock remote tracker 30 onto the object. Operator 42 has to accurately calculate and estimate the expected location of the object at the time in the future when the tracking instructions are to arrive at sensing unit 20. Only then is pointing control 34 pointed to the calculated estimated location, and remote tracker 30 instructed to lock and initiate tracking.

If the estimated location calculation is not accurate enough, remote tracker 30 will lock onto some other background object and the entire estimate, calculate and lock process has to be repeated. As such, the effect is a continuous feedback control loop with delay, a situation which is liable to suffer from overshoots and instability.

The locking process is complicated even more by the human input in the tracking loop. Human reactions and directions are less precise than, for example, computer or processor generated instructions. Humans do not function well in feedback loops with time delay, such an example being the typical daily experience of adjusting the temperature of hot water from a faucet with a slow reaction time.

WO 00/46985 attempts to cope with the delay problem by offering an approach as described with reference to FIG. 2. Note that the following description of FIG. 2 is taken from the '985 publication and has not been amended to cope with inaccuracies except for only a few minor modifications.

As shown in FIG. 2, tracking system 50 provides a reduced time delay by supplying the lock instructions directly from stick 40 to a local control tracker 60, in contrast to the prior art system (described with reference to FIG. 1) which supplied the lock instructions to remote tracker 30. System 50 additionally provides improved tracking ability by supplying tracking instructions directly from control tracker 60 to sensor remote tracker 30, and thus providing more exact tracking/locking instructions than those experienced by the previously described tracking systems.

As shown, system 50 comprises an image sensing unit and a control station 52, which are connected via a communication link 55.

Sensing unit 70 locates a desired object, and sends sensor data 24 to control station 52. Control station 52 sends control data 56 such as pointing and tracking instructions to image sensing unit 70. Control data 56 travels in the direction represented by arrow B.

Communication link 55 is connectable to sensing unit 70 and control station 52 via sensor communication unit 28 and control communication unit 36, respectively.

As opposed to the system of FIG. 1, control station 52 additionally comprises a control tracker 60. Stick 40 transfers coarse tracking instructions to pointing control 34 and control tracker 60 transfers direct tracking and locking instructions to sensor remote tracker 30.

Furthermore, sensing unit 70 comprises a processor 62 and a memory 64. Additionally image sensor 32 transfers generally identical image data to remote tracker 30 and to control tracker 60. Hence, control tracker 60 and remote tracker 30 operate from the same data, and tracking instructions from control tracker 60 are more direct and precise than prior art tracking instructions.

Direct instructions from control tracker 60 to remote tracker 30 is a useful advantage over previously described system 10, where the locking instructions were determined by the operator as gleaned from an image seen on display 38, and then estimated and transferred from stick 40 to tracker 30. The measurements are then fed into a mathematical predictor, which can accurately predict object location. In such a manner, system 50 is free of operator induced errors related to coarse eye/hand coordination.

A sequence of operation in accordance with this prior art solution is described with reference to FIG. 3. Note that the following description of FIG. 3 is taken from FIG. 3A of the '985 publication and has not been amended to cope with inaccuracies except for only a few minor modifications.

Thus, flow of data images, generally designated I (sensor data 24), to control station 52, and specifically control tracker 60. It is noted that image I1 is taken at time T1, (not shown in FIG. 3) and image In is taken at time Tn, which is later than time T1. FIG. 3 additionally illustrates the flow of a tracking/locking command image, generally designated C1 (control data 56), to sensing unit 70, and specifically remote tracker 30.

As previously noted, the transfer of sensor data 24 takes an extended amount of time. Hence, although sensing unit 70 acquires a data image I1 at time T1, the data image 11 is not received at station 52 until time Tn, which is relatively the same time as when sensing unit 70 is acquiring data image In. As illustrated in FIG. 3, although sensing unit 70 is acquiring and sending data image In, control station 52 is just receiving data image I1.

It is noted that data images I include a sensed object 66. It is additionally noted that the location of object 66, as sensed by sensing. unit 70, moves from data image I1 to data image In.

Therefore, once a decision has been made to lock onto or track object 66, control tracker 60 transfers tracking/locking command image CIn to remote tracker 30. Command image CIn is an associated data image In with the appropriate command attached, e.g. command image CI1 is associated data image I1 with a lock command attached. Thus, control tracker 60 establishes a coordinated reference image with remote tracker 30. Accordingly, both remote tracker 30 and control tracker 60 refer to the same image (data image 11) and the location of object 66 is known and referenced from data image I1.

Thus, although at time Tn sensing unit 70 is currently sensing the image In, upon receipt of command image CI1, remote tracker 30 refers to image I1 and is able to make positive identification.

Sensing unit 70 stores in memory 64 the past records of data images I. Upon receipt of command image CI1 referring to object 66 in data image I1, tracker 30, searches through the records in memory 64 for the appropriate image, and positively identifies object 66 from that record. Remote tracker 30 identifies object 66 as designated in data image I1 via the known in the art methods listed hereinabove. Remote tracker 30 then scans from data image I1 through to the data image In, tracking object 66 from data image to data image. The delay A and B specified above are coped with seeing that the remote tracker 60 is eventually capable of locating the object in the currently acquired image.

While the solution described with reference to FIG. 2 indeed provides certain improvement over solutions such as those described with reference to FIG. 1, it falls short to cope with certain typical scenarios. For instance, in the sequence of operation described with reference to FIG. 3, the object resides in all images (I1 to In), facilitating, thus simple tracking when running through the history images. This, however, is not always the case and there may be situations where the object escapes from the field of view, and it is still required to track it and locate its position in real time.

There is, thus, a need in the art to provide for a new method and system for tracking moving objects.

RELATED ART

EP 0423 984: Target tracking capability is provided by a synergistic tracker system which includes both a correlation tracker and an object tracker for processing sensor data input and for generating tracking error signals. The operation of the synergistic tracker system is controlled by central processing unit. The system operates by first correlating a reference region image with a portion of a current digitized image provided by analog to digital converter. Secondly, the object tracker provides a precisely defined track point for an object within the current image. The correlation tracker stabilizes and limits the portion of the digitized image that the object tracker must operate upon. Stabilizing and limiting this portion of the digitized image reduces the object tracker's sensitivity to background clutter and sensitivity to a loss of lock induced by sensor motion. The object tracker provides a non-recursive update for the correlation's reference region image. The correlation tracker and the object tracker are used simultaneously and cooperatively so that the strengths of one tracker are used to overcome the weaknesses of the other. The invention achieves a greater tracking tenacity, a reduction in tracker angle noise, and a reduction in hardware complexity.

Note that the reference to the publications above is in the context of background of the invention only, and accordingly the invention, as described below, is not bound by the content and/or terminology used in the specified prior art publication.

Turning to a different discussion, in the context of tracking objects an operator typically views a scene on a screen and attempts to point to a moving object of interest for triggering, say a tracking/locking action. To this end, he typically uses pointing means associated with a screen for pointing on the object of interest. However, in certain scenarios due to the motion of the object in the displayed succession of images, some operators may find it difficult to point on the sought object (requiring trained eye/hand coordination) and may instead point on background area or some other object. In the cases that the tracking/locking should be performed in real-time, this miss-point may lead to failure of the mission.

There is thus a need in the art to provide for an improved technique that will facilitate simple and substantially fault-free pointing means on a desired object which is subject to tracking/locking.

SUMMARY OF THE INVENTION

According to a first embodiment of the invention there is provided a method for tracking an object that is embedded within images of a scene, comprising:
(a) in a sensor unit that includes movable sensor, generating, storing and transmitting over a communication link a succession of images of a scene;
(b) in a remote control unit, receiving the succession of images;
(c) receiving a user command for selecting an object of interest in a given image of said received succession of images or derivative thereof, determining object data associated with said object and transmitting through said link to said sensor unit at least said object data;
(d) in the sensor unit, identifying the given image of the stored succession of images and the object of interest using said object data, and tracking the object in at least one other image of said stored succession of images, said other image being later than said given image;
(e) in the case that said object cannot be located in the latest image of said stored succession of images, using information of at least two images in which said object was located to predict estimated real-time location of the object and generating direction command to the movable sensor for generating realtime image of the scene and locking on said object.

According to a second embodiment of the invention there is provided a system that includes a sensor unit that includes movable sensor, the sensor unit is configured to generate a succession of images of a scene, a remote control unit configured to communicate with the sensor unit through a communication link and receive through the link at least said succession of images, and transmit through said link object data that pertain to an object that is embedded in images of the scene, in response to selection of the object in an image;

the system is configured to accomplish substantially real-time location of the object notwithstanding a time delay constituted by a timing difference between a first timing that an image including the object is generated in said sensor and a second timing in which said object is located in real-time image, comprising:
in the control unit, determining object data associated with the object in a given image of said received succession of images or derivative thereof, and transmitting through said link to said sensor unit at least said object data;
in the sensor unit, identifying the given image of the stored succession of images and the object of interest using said object data, and in the case that the object is not located in the latest image of said succession of images, estimating current location of the object, and generating direction commands to said sensor for generating real-time image and locking on said object.

According to a third embodiment of the invention, there is provided a method for selecting a moving object within images of a scene, comprising:
receiving through a communication link a succession of images;
freezing or slowing down a rate of a given image of said succession of images and selecting an object of interest in the frozen given image, as if said object being stationary;
determining object data associated with said object and transmitting through said link at least said object data.

This method (the third embodiment of the invention) is for use with a method for tracking an object that is embedded within images of a scene, e.g. as described above with reference to the first embodiment of the invention.

According to an embodiment of the invention there is illustrated a method for selecting a moving object within images of a scene, comprising:
a. receiving through a link a succession of images;
b. freezing or slowing down a rate of a given image of said succession of images and selecting an object of interest in the given image, as if said object is stationary;
c. determining object data associated with said object;

According to an embodiment of the invention there is still further illustrated a system that includes a sensor unit that includes movable sensor, the sensor unit is configured to generate a succession of images of a scene, a remote control unit configured to communicate with the sensor unit through a communication link and receive through the link at least said succession of images, and transmit through said link object data that pertain to an object that is embedded in images of the scene, in response to selection of the object in an image;
the system is configured to accomplish substantially real-time location of the object notwithstanding a time delay constituted by a timing difference between a first timing that an image including the object is generated in said sensor and a second timing in which said object is located in real-time image, comprising:
in the remote unit
receiving through the link a succession of images; freezing or slowing down a rate of a given image of said succession of images and selecting an object of interest in the given image, as if said object is stationary; and determining object data associated with said object.

In accordance with an aspect of the invention there is further illustrated a method for indicating an area in an image as a candidate of a sought object of interest in a scene, comprising:
receiving data indicative of estimated future coarse location of an object in the scene; generating a succession of images of an area in the scene, the images includes the estimated coarse location,
comparing between at least two images of said succession, and in the case of difference in at least a portion of respective images that meets a given threshold, the difference is identified as the candidate object.

In accordance with an aspect of the invention there is still further illustrated a system that includes a sensor unit that includes movable sensor, the sensor unit is configured to generate a succession of images of a scene, a remote control unit configured to communicate with the sensor unit through a communication link and receive through the link at least said succession of images, and transmit through said link object data that pertain to an object that is embedded in images of the scene, in response to selection of the object in an image;
the system is configured to accomplish substantially real-time location of the object notwithstanding a time delay constituted by a timing difference between a first timing that an image including the object is generated in said sensor and a second timing in which said object is located in realtime image, comprising:
in the sensor unit, receiving data indicative of estimated future coarse location of an object in the scene; generating a succession of images of an area in the scene, the images include the estimated coarse location, and comparing between at least two images of said succession, and in the case of difference in at least a portion of respective images that meets a given threshold, the difference is identified as the candidate object.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Before turning to the specific description it should be noted that the terms tracking and locking are used interchangeably.

Note also that the description with reference to FIGS. 4 to 6 serves for explaining few possible configurations of a system and method of the invention, as described later with reference to specific embodiments depicted in FIGS. 7 and 8.

Figure 4:
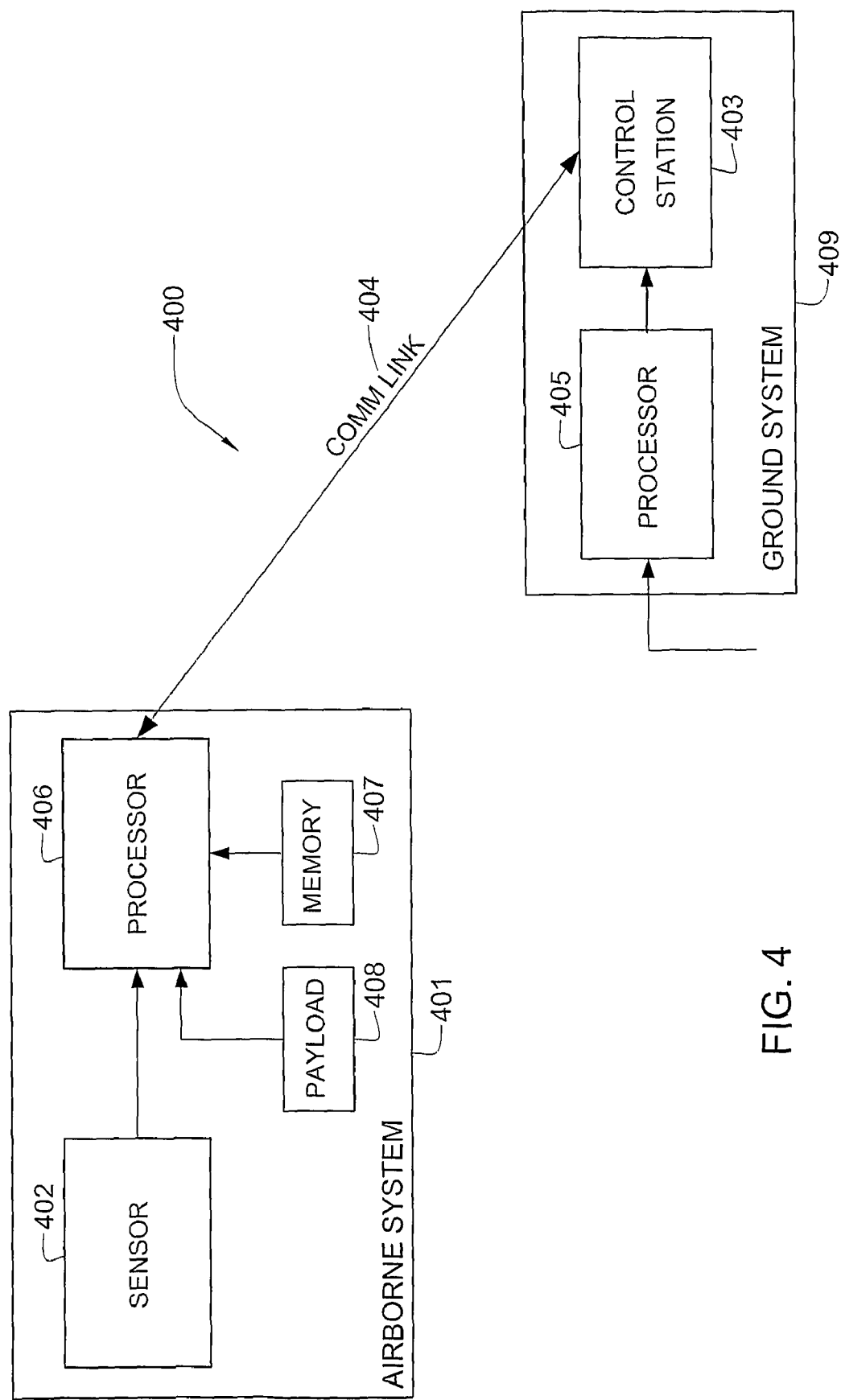
FIG. 4 illustrates schematically a generalized system architecture in accordance with an embodiment of the invention.

Turning now to FIG. 4, there is shown a generalized system architecture (400) in accordance with an embodiment of the invention. Thus, by this example, the system includes an airborne sub-system (401), that includes a sensor unit (402) (e.g. video camera fitted on a sensor direction system, such as gimbal mechanism, for directing the video camera in the desired direction), configured to generate a succession of images of a scene.

The system further includes a remote control unit/station (say ground station (403)) configured to communicate with the sensor unit through a communication link (404) and receive through the link the succession of images.

In the ground control station, the user selects in one of the images an object of interest (which is the subject for tracking), by using, say, pointing means and in response, a processor (405) calculates data pertaining to the object. The data is transmitted through the link (404) to the remote sensor. Note that the invention is not bound by a specific pointing means. For instance, in certain scenarios the pointing means is a cursor controlled by a stick or mouse. The invention is likewise not bound by a specific use of processor architecture. Thus, by way of example a single processor, plurality of processors operating distinctly or in parallel, and/or other variants, all as known per se.

In accordance with certain embodiments the pointing means are means to interpret audio commands issued by the user identifying the object for interest. For instance, if the object is a vehicle, then in response to an audio command "vehicle" there commences a procedure (executed on processor 405) for "understanding" the meaning of the command (in this case vehicle) and identifying an object that matches a vehicle in the image (assuming that there is only one vehicle in the image). There are known per se voice analysis and recognition as well as image processing techniques to accomplish the specified example of pointing means. Other pointing means are applicable. The invention is likewise not bound by a specific use of processor architecture. Thus, by way of example a single processor, plurality of processors operating distinctly or in parallel, and/or other variants, all as known per se.

In certain embodiments, the object data can be one or more of the following: location of the object, speed of the object, acceleration of the object, size of the object, shape of the object, color of the object. The object data further includes indication on the image that was selected and which includes the sought object. The specified data is calculated in the ground station using known per se techniques. In certain embodiments the data may include the entire image or portion thereof (e.g. the video frame, or portion thereof, accommodating the object).

As may be recalled (with reference to FIG. 3), although sensing unit is acquiring and sending data image In, the control station (e.g. ground station) has just received data image I1. This time delay (caused by the communication and other delays) and additional time delay stemming from the time that has elapsed from the arrival of image I1 to the ground station until the user selects the desired image (which accommodates the object of interest) are coped by the system of WO 00/46985.

Figure 3:
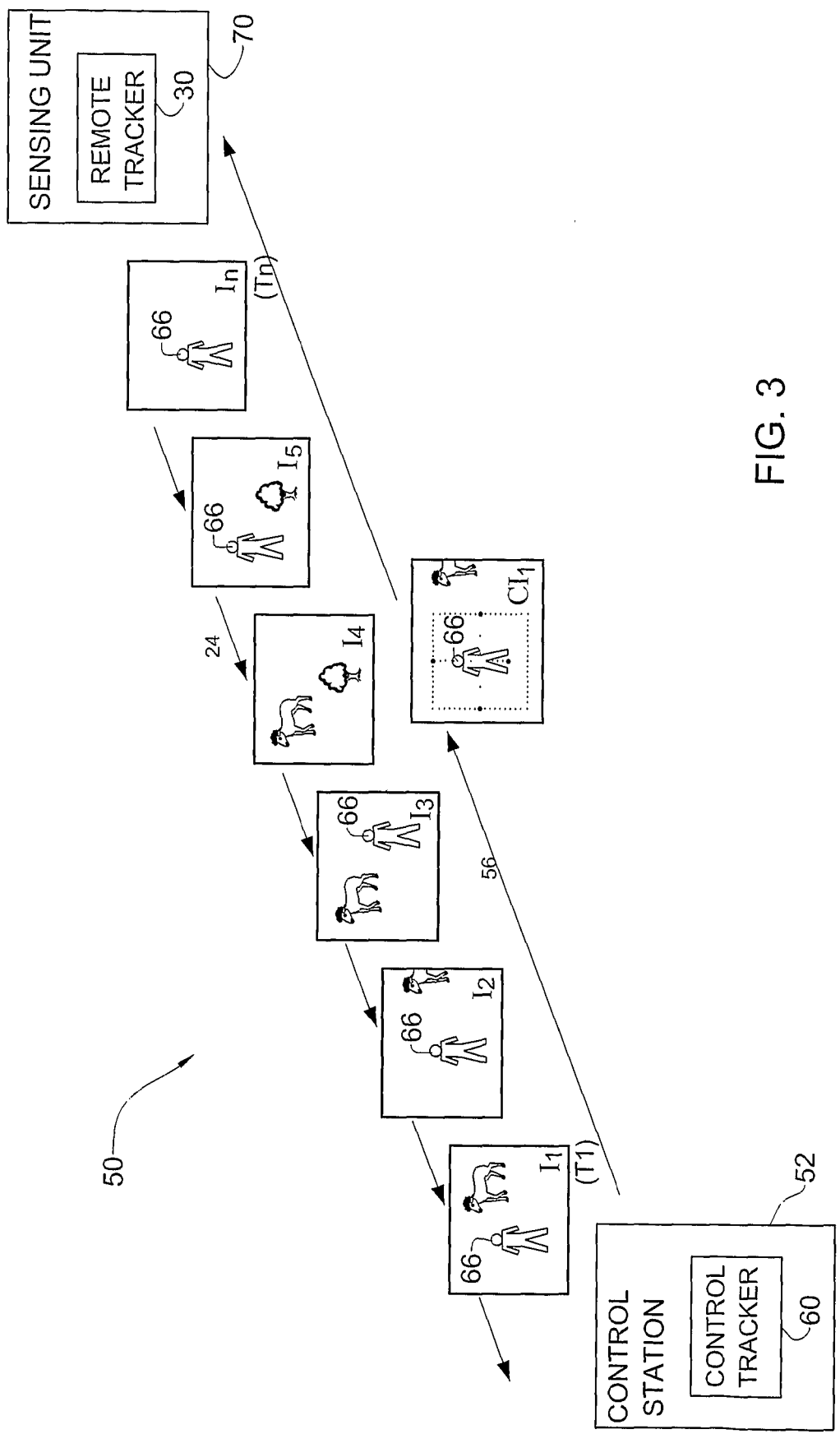
FIG. 3 illustrates schematically a sequence of tracking operations in accordance with the prior art.

More specifically, as shown in FIG. 3, the CI1 data transmitted from the ground station to the control tracker 60 establishes a coordinated reference image, for instance both remote tracker 30 and control tracker 60 refer to the same data image (I1) and the location of object 66 is known and referenced from data image I1.

Note (with reference also to FIG. 2) that sensing unit 70 stores in the memory the past records of data image I1 and accordingly upon receipt of command CI1 referring to object 66 in data image I1, tracker 30, searches through the records in memory 64 for the appropriate image, and positively locates object 66 from that record. By the time that CI1 is received and processed in sensing unit 70, the memory 64 stores records of I1 . . . In . . . Im. As may be recalled, In was acquired by the time that I1 is received in control station 52, however there elapses additional delay stemming from the duration that the operator selects the image, (say, I1), points on the desired object deriving the object related data for generating CI1, the uplink communication travel time to the sensing unit 70 and the processing time of CI1 in the sensing unit for identifying I1 as the coordinated reference. By the latter time, image Im has been acquired (obviously in later timing than In) and stored in the memory.

In accordance with the '985 publication, Remote tracker 30 scans the history from data image I1 through image Im, tracking object 66 from data image to data image.

In this manner, according to the '985 publication, notwithstanding the delay, the sought object can be tracked and located in real-time (in image Im).

However, the solution according to the '985 application addresses only a few out of many possible available operational scenarios, namely, that the object is accommodated in any of the images I1 to Im.

Figure 5:
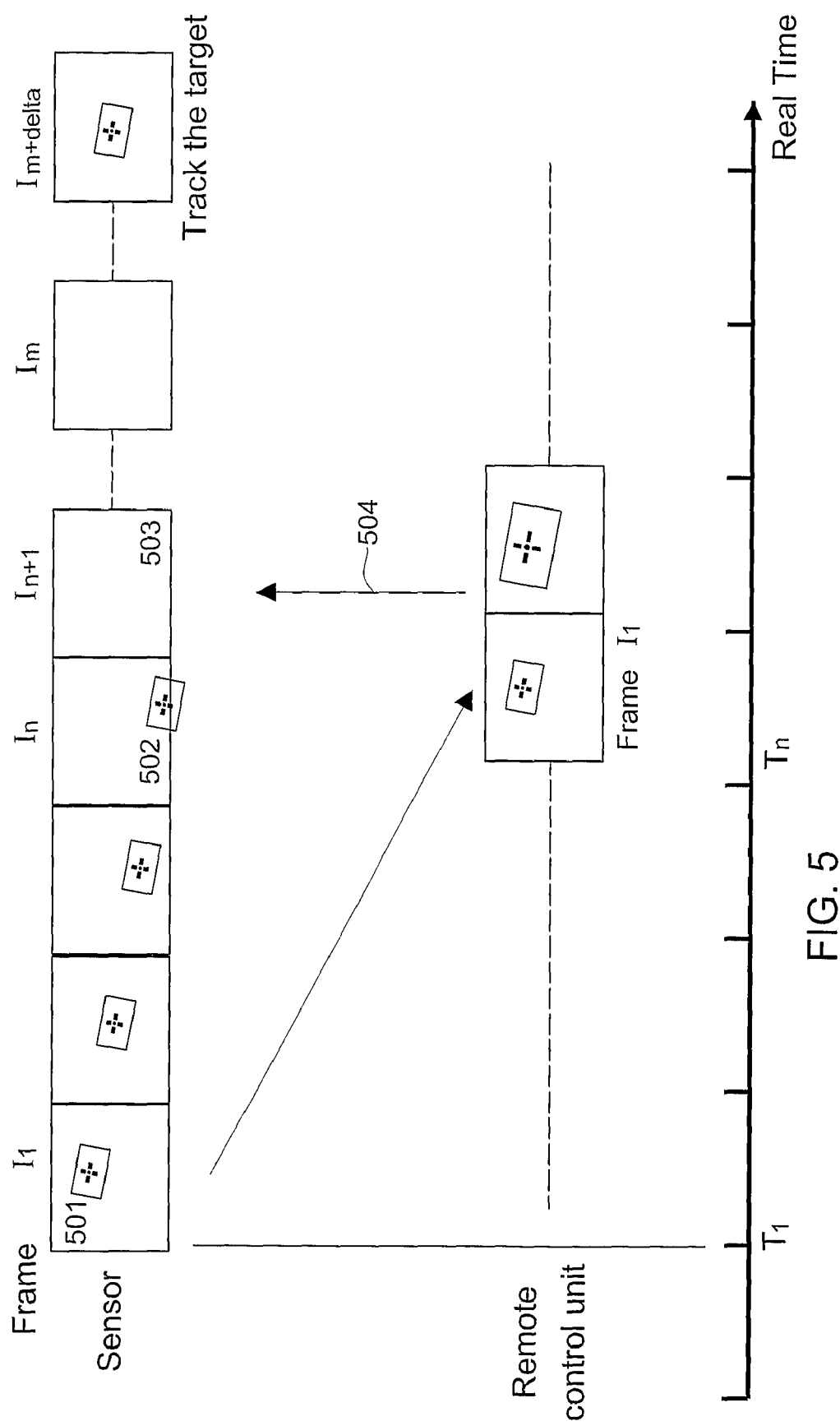
FIG. 5 illustrates schematically sequence of tracking operations in accordance with an embodiment of the invention.

For a better understanding of an operational scenario that is not anticipated by the '985 publication attention is directed also to FIG. 5 (and occasionally also to FIG. 4), illustrating schematically a sequence of tracking operations in accordance with an embodiment of the invention. Note, incidentally, that the object (501) is depicted in FIG. 5 as a symbol "+".

It is assumed that the a succession of images I1 to In was acquired by the sensor (402) (starting at T1) and transmitted through link (404) to the ground station (I1 arriving to the ground station at Tk) and an object (501) was selected in the ground station, and, I response, data pertaining to the sought object (504) was calculated and transmitted to unit 401 through link 404, all as described with reference to FIG. 3.

The succession of images I1 to Im (e.g., succession of video frames) is also stored in memory 407 of the airborne sub-system. Due to the coordinated reference described above, the processor (406) can locate the object (501) in the image I1 (acquired at T1) and stored in the buffer substantially at T1 notwithstanding the fact that I1 was received at the ground station at a later time Tn (due to communication delay over link 404).

However, unlike the limiting scenario described in the '985 publication, if the object managed to move and deviate from the field of view of the sensor and consequently only partially appears in image In (502) and completely disappears from image In+1 (503) as well as the succeeding images. Accordingly, using the technique of the '985 publication, would fall short since scanning the history would not lead to locating the object in the real-time acquired image Im.

In accordance with certain embodiments of the invention, in the case that the object is not located in the latest image of said succession of images (in this particular case the object cannot be located in Im since it is only partially located in In and not at all in In+1), an additional processing phase is invoked for estimating the current location of the object, and generating direction commands to the sensor for generating real-time image that includes said object.

As shown in FIG. 5, the current location of the object is estimated, e.g. based on calculating the trajectory that the object has traveled so far. By one example, the trajectory can be determined in a succession of images, say from I1 to In and based on the so determined trajectory estimating the current location of the object in Im, using known per se trajectory estimation techniques.

Having determined the estimated location of the object, appropriate commands can be sent for directing the sensor (e.g. providing appropriate direction commands to the gimbal mechanism to which the sensor is mounted on, allowing the sensor to acquire real-time image that includes the sought object. (image Ix acquired at timing of image Im and an additional time interval Δ). Note that the time interval Δ is indicative of the duration it takes for directing the sensor to the desired new location for acquiring a real-time image which includes the object. The calculation of the object's location in real time should take into account also the duration for mechanically/electronically redirecting the sensor. Note that the invention is not bound by any specific trajectory determination and/or estimation techniques.

In accordance with certain embodiments the trajectory determination does not necessarily require to utilize the succession of images starting from I1 and ending at Ik, and accordingly any two or more images can be utilized to this end.

In accordance with certain embodiments the so utilized images are not necessarily consecutive.

Note that in the context of various embodiments described herein, when reference is made to image(s) it encompasses, whenever applicable, also derivative thereof, namely images which were subjected to further processing. Thus, for example, in accordance with certain embodiments, a derivative image can be one or more image which has (have) been subjected to zooming, or in accordance with another embodiment a derivative image can be one or more image which was (were) processed for emphasizing certain zones therein (e.g. giving rise to a better contrast between the sought object and the vicinity), etc. Whenever desired additional image enhancement techniques can be applied such as emphasizing contrast and boundaries and/or other known per se image enhancements.

Note also that whereas the latter example illustrated selecting the object at I1, obviously the selection of the object (at the ground station) can be at another, later, image. Thus for instance if the object is selected in image I3, the latter would constitute the coordinate reference since CI3 data received at the airborne sub-system would include information that the coordinated reference image is I3. Note also that for convenience, the latter example illustrated that the sought object is accommodated in all images until In (which is the image that is acquired by the time that I1 is received in the ground station). This, of course, is not obligatory and in accordance with other examples the object can "disappear" in any image Ik (where Ik being acquired before or after In, which the case may be).

Figure 6:
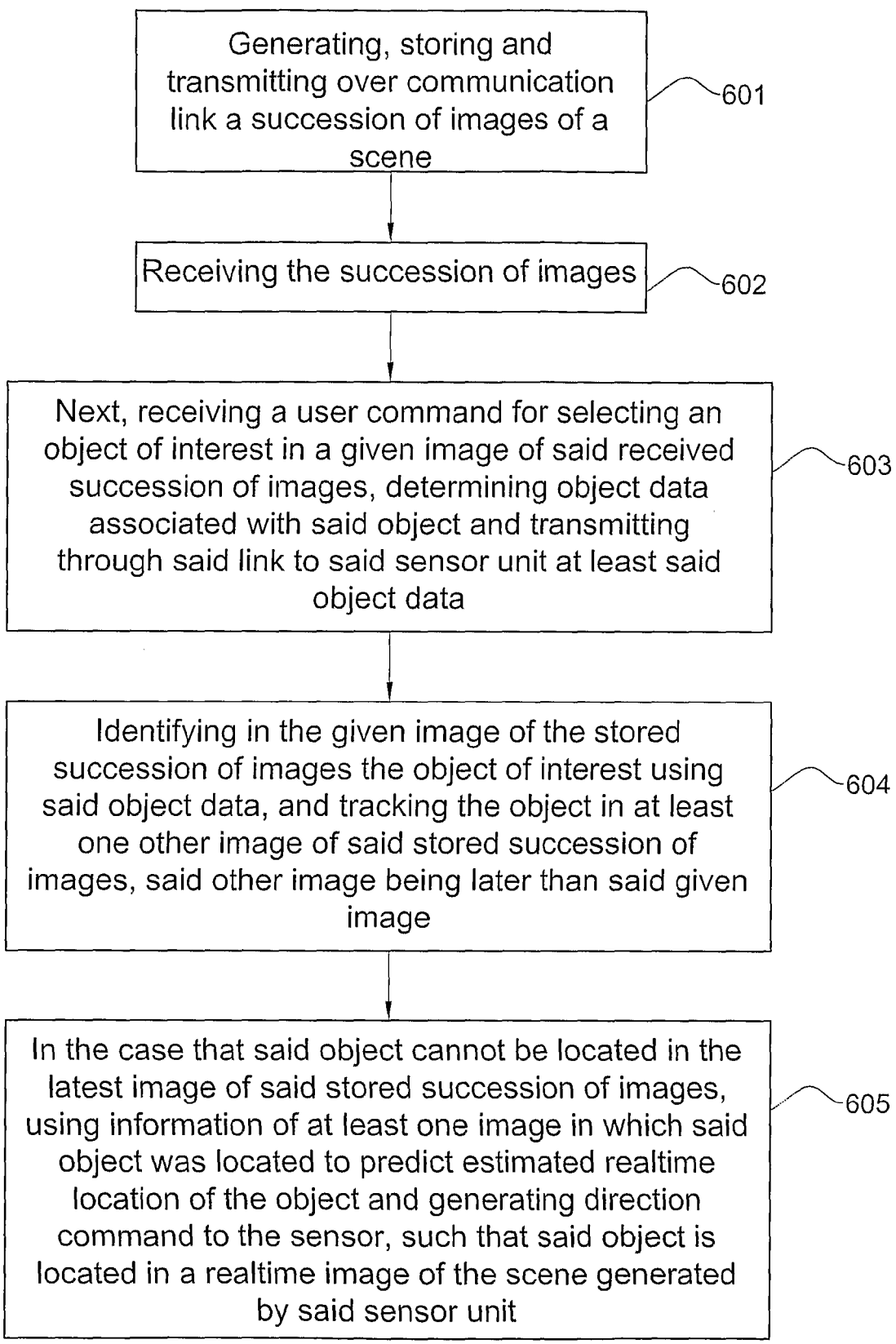
FIG. 6 illustrates a generalized flow chart of operational stages of a system in accordance with an embodiment of the invention.

Bearing this in mind, attention is drawn to FIG. 6, illustrating a generalized flow diagram of operational stages of a system in accordance with an embodiment of the invention. Thus, in accordance with this embodiment, in the sensor unit (401), generating, storing and transmitting over communication link a succession of images of a scene (601). In the remote control unit (403), receiving the succession of images (602).

Next, receiving a user command for selecting an object of interest in a given image of said received succession of images, determining object data associated with said object and transmitting through said link to said sensor unit at least said object data. (603).

In the sensor unit (401), identifying in the given image of the stored succession of images the object of interest using said object data, and tracking the object in at least one other image of said stored succession of images, said other image being later than said given image (604).

In the case that said object cannot be located in the latest image of said stored succession of images, using information of at least one image in which said object was located to predict estimated real-time location of the object and generating direction command to the sensor, such that said object is located in a real-time image of the scene generated by said sensor unit (605).

In accordance with certain embodiments, there is further provided payload means (408) that are controlled in response to the real-time location data of the object. In certain embodiments, with the payload means being kill mechanism, for killing the locked object. An example is a missile mounted on the airborne unit and capable of being launched towards the locked object.

In accordance with certain embodiments the payload being designator means, e.g. laser beam for illuminating the object.

In accordance with certain embodiments the payload means includes data collection means, such as Radar, operating autonomously, or in association with a remote unit (not shown) for collecting data for use in intelligence applications.

Figure 1:
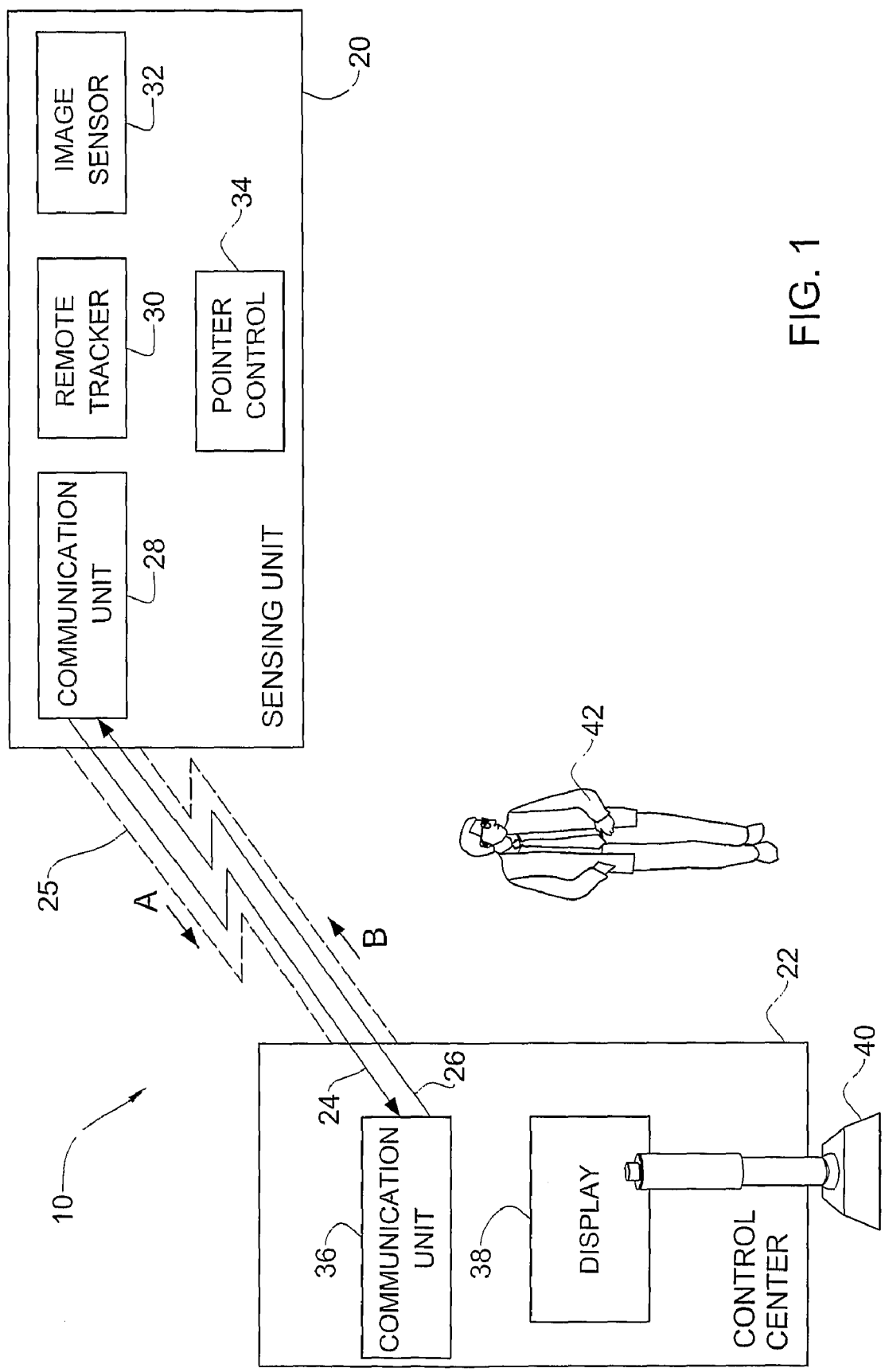
FIG. 1 illustrates schematically a prior art tracking system serving as a background discussion.
Figure 2:
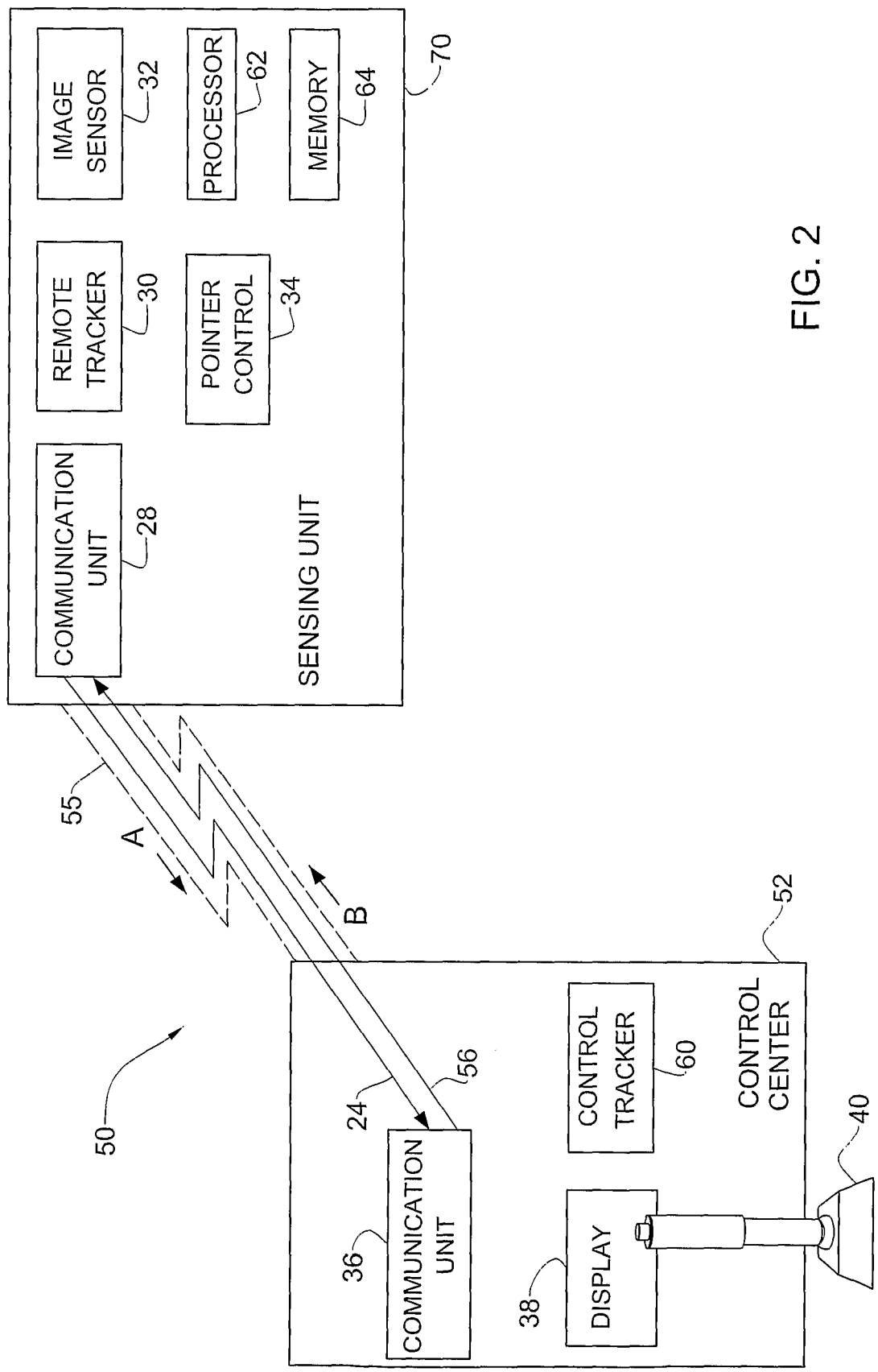
FIG. 2 illustrates schematically another system architecture, in accordance with the prior art.

Note, generally, that while the invention is described occasionally with reference also to prior art FIGS. 1 to 3, those versed in the art will readily appreciate that the invention is by no means bound to the specific realization of FIGS. 1 to 3, and also not to the general system architecture according to the embodiment of FIG. 4.

The description with reference to FIGS. 4 to 6 above serves for explaining a few non-limiting examples used in the context of the invention as will be described below. The invention is not bound by these specified examples.

Turning now to another embodiment of the invention, concerning the particular event of pointing to a desired object which moves between successive images. Note that the term moving should be interpreted as an object moving relative to a stationary sensor, a sensor moving relative to a stationary object, and both sensor and object are moving one with respect to the other. Intuitively, a moving object is an object that moves between frames as viewed by the user. As specified above, selecting of an object can be performed by using pointing means, such as cursor controlled by input means (e.g. stick, mouse, etc.). As may be recalled, when tracking objects, an operator is requested to select (e.g. by pointing) on a moving object for triggering a tracking action. However, in certain scenarios due to the motion of the object in the displayed succession of images, some operators may find it difficult to point on the sought object (requiring trained eye/hand coordination) and may instead point on background area or some other object.

In the cases that the tracking should be performed in real time, this mis-selection may lead to failure of the tracking mission, due to the time that elapsed until the operator applies another selection for pointing on the appropriate object.

In some applications, where, for instance, the selection of the object may lead to locking thereon and triggering a kill mechanism for destroying the object, such a mis-selection of the appropriate object may lead to dire consequences.

These embodiments will be described, for convenience only, with reference to the system architecture of FIG. 4 and various embodiments described above.

Figure 7:
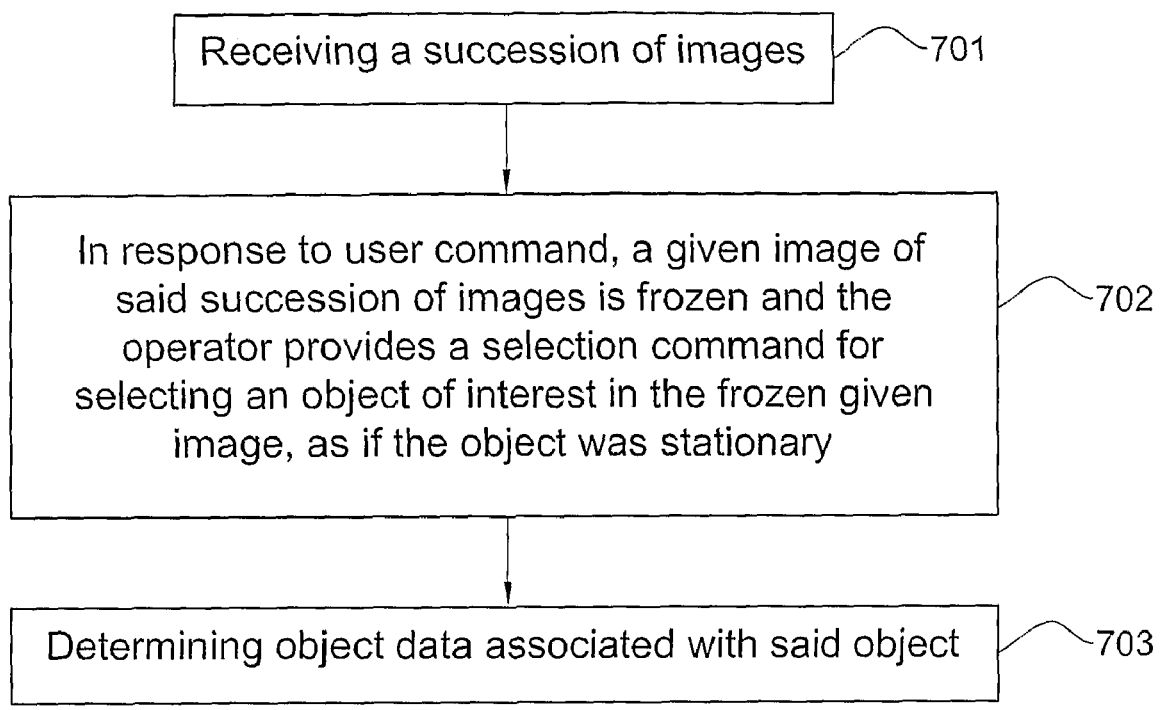
FIG. 7 illustrates a generalized flow chart of operational stages of a system in accordance with another embodiment of the invention.

Turning now to FIG. 7, it illustrates a generalized flow chart of the operational stages of a system in accordance with an embodiment of the invention.

Thus, at the onset a succession of images is received (701). Note that in accordance with these embodiments, images can be, for instance, received from an external source (through communication channel). In accordance with certain other embodiments images can be generated locally and received from the image generation module.

Referring now to the example of FIG. 4, a succession of images are transmitted over the communication link 404 from the sub-system 401 to the control station 403. In accordance with prior art approaches, the operator had to select the moving object of interest. However, as specified above, due to eye/hand mis-coordination, a wrong object may be selected.

In order to cope with this shortcoming, in response to user command (say input 409), a given image of said succession of images is frozen (through appropriate processing in processor 405) and the operator provides a selection command for selecting an object of interest in the frozen given image, as if the object were stationary (702). The freezing of the image is accomplished using known per se means. Obviously the prospects of pointing on the desired object within a frozen image are substantially higher thereby coping with the inherent eye/hand mis-coordination discussed above.

Having selected the object of interest, the processor (say 403) can determine object data associated with said object, in a similar fashion described above. In certain embodiments the so determined data can be transmitted through said link (e.g. 404 of FIG. 4).

Note that in certain embodiments instead of freezing, slowing down the image rate, may suffice.

In accordance with certain embodiments, after freezing, the image is zoomed giving rise to an enlarged object, thereby further facilitating selection of an object of interest, or a desired portion of the object.

Figure 8:
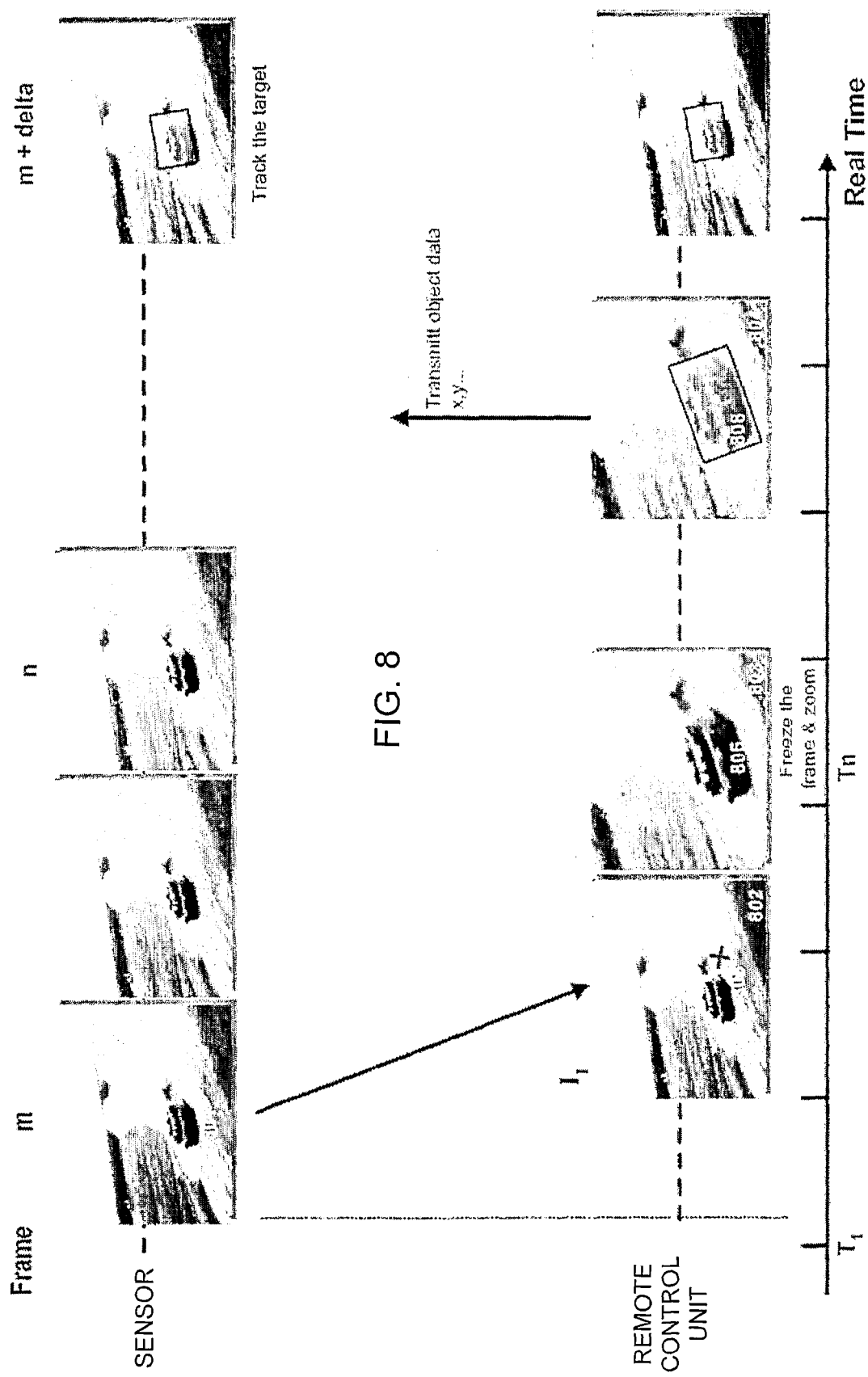
FIG. 8 illustrates schematically a sequence of operations in accordance with another embodiment of the invention.

For a better understanding of the foregoing, attention is drawn to FIG. 8, illustrating a sequence of operations in accordance with an embodiment of the invention. The sequence of operation is very similar to that described with reference to FIG. 5, and therefore it will not be further expounded upon herein. Note that the object that was marked as "+" in FIG. 5 (e.g. 501), is a moving vehicle (801) in FIG. 8.

Attention is particularly drawn to image 802 (designated I1) as received in the control station. The operator is now required to select an object of interest. In accordance with an embodiment of the second aspect, the image 11 is frozen and zoomed (803) facilitating easy selection of the stationary object (by pointing to the enlarged object 801—after having been zoomed—as indicated by means of rectangular 804 bounding object 801). The appropriate object data can now be calculated, all as described in detail above.

In accordance with certain embodiments, said selection is performed by pointing to an object or in the vicinity thereof (e.g. in area 805 in close vicinity to object 801 in frame 803), thereby zooming the image according to image boundaries substantially defined by said pointing. Note that by this embodiment, the boundaries of the area 805 in the vicinity of the object are determined by placing the cross (first selection) depicted at the right hand side of the object in frame 802.

Now the object is selected (second selection) by additional pointing thereto (on the zoomed image). In the specific example of FIG. 8, the boundaries of the zoomed image will be prescribed substantially by the point 805. This, of course, would allow a subsequent easy and almost full proof selection of the desired object. In accordance with certain embodiments, in case the object does not reside in the zoomed image, an appropriate command can be invoked for undo the zooming operation and reselecting the zoomed area (in the previous image or in a newly received image) which will now accommodate the sought object.

Note incidentally, that the zooming/freezing would naturally lead to further delay since by the time that the image is frozen and the operator selects the object in the frozen image, the location of the moving object keeps changing, thereby further hindering the delayed tracking. This additional delay can also be coped with, since the object data that pertain to a given image would be transmitted to the sub-system 401 and a coordinated reference image would still be established, allowing searching through the history to locate the object in real time using techniques of the prior art (as disclosed e.g. in the cited '985 publication) or in accordance with the various embodiments described above.

Figure 9:
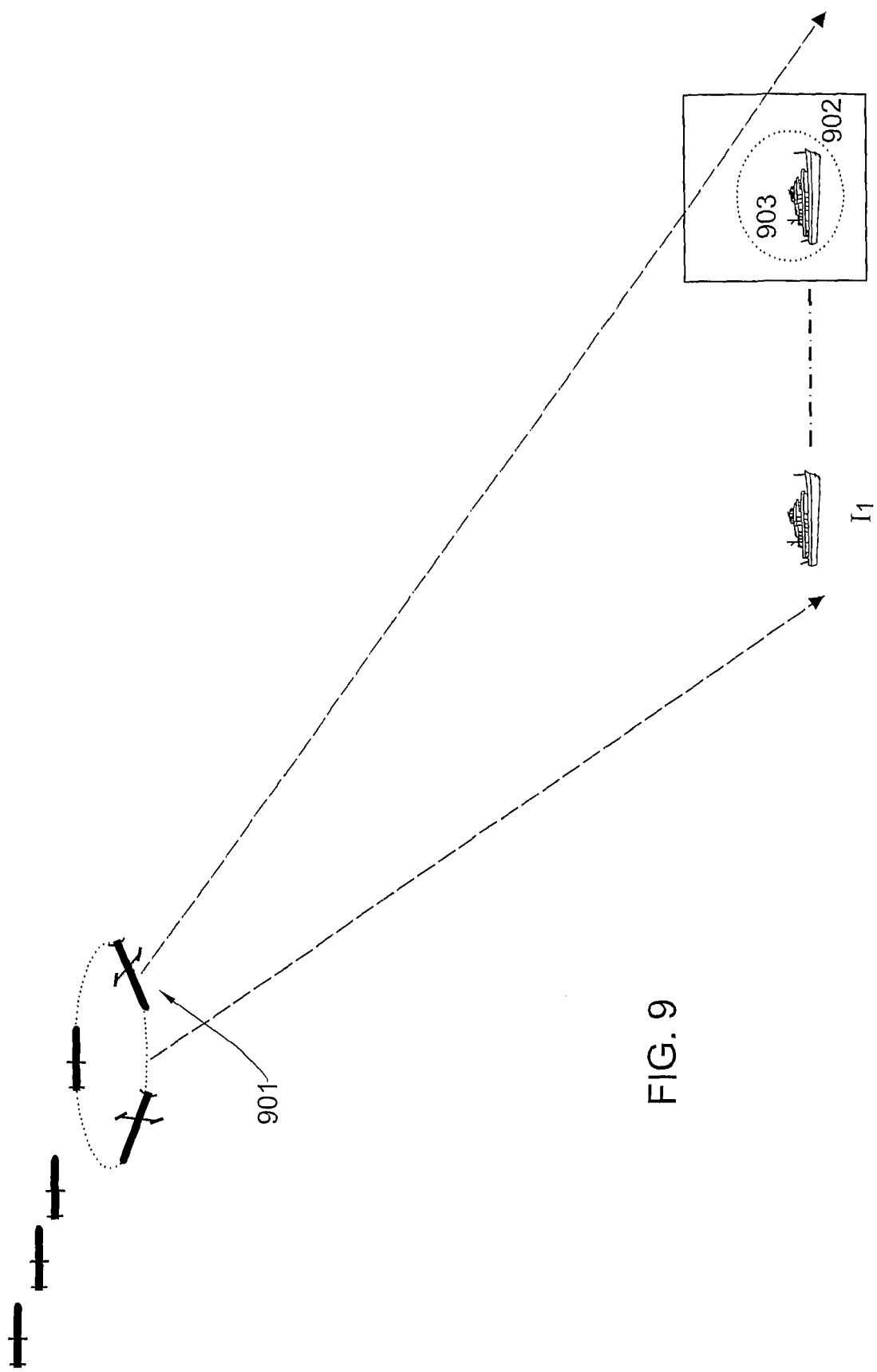
FIG. 9 illustrates an operational scenario in accordance with an embodiment of an aspect of the invention.
Figure 10:
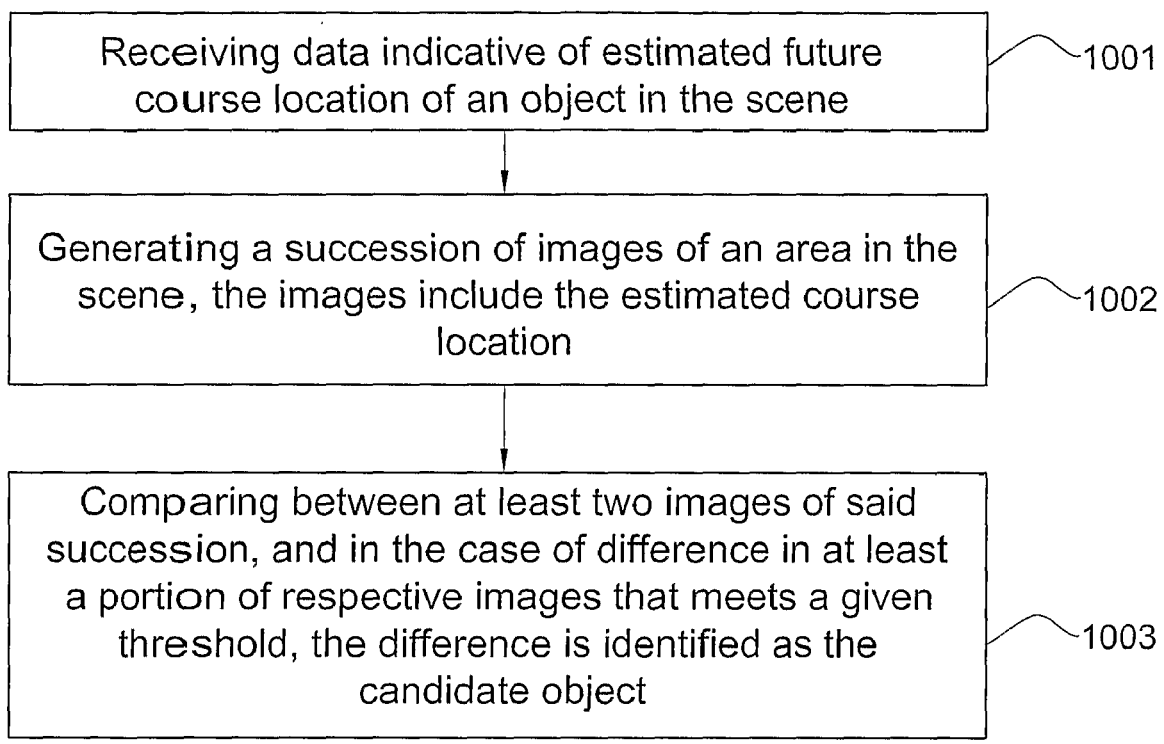
FIG. 10 illustrates a generalized flow chart of operational stages of a system in accordance with an embodiment of an aspect of the invention.

Turning now to another aspect of the invention, it should be noted that the description with reference to FIG. 4 serves for explaining few possible configurations of a system and method of the invention, as described later with reference to specific embodiments depicted in FIGS. 9 and 10. The invention as described with reference to the specific embodiments of FIGS. 9 and 10 is not bound by the specific architecture of FIG. 4.

Bearing this in mind attention is drawn to FIG. 4, showing a generalized system architecture (400) in accordance with an embodiment of the invention. Thus, by this example, the system includes an airborne sub-system (401), that includes a sensor unit (402) (e.g. video camera fitted on a sensor direction system, such as gimbal mechanism, for directing the video camera in the desired direction), configured to generate a succession of images of a scene. The system further includes a remote control unit/station (say ground station (403)) configured to communicate with the sensor unit through a communication link (404) and receive through the link the succession of images.

In the ground control station, the user selects in one of the images an object of interest (which is the subject for tracking), by using, say, pointing means and in response, a processor (405) calculates data pertaining to the object. The data is transmitted through the link (404) to the remote sensor. Note that the invention is not bound by a specific pointing means. For instance, in certain scenarios the pointing means is a cursor controlled by a stick or mouse. The invention is likewise not bound by a specific use of processor architecture. Thus, by way of example a single processor, plurality of processors operating distinctly or in parallel, and/or other variants, all as known per se.

In certain embodiments, the object data can be one or more of the following: location of the object, speed of the object, acceleration of the object, size of the object, shape of the object, color of the object. The specified data is calculated in the ground station using known per se techniques.

In accordance with the invention, it is desired to predict the future location of the object of interest.

A possible motivation for this approach is, by way of a non-limiting example, the delay discussed in the background of the invention section. Thus, as illustrated in FIG. 3, by the time that the control station receives image I1, a later image in is already acquired by the sensor. Consequently, the operator knows that the location of the object that he views in I1 is not the realtime location thereof. Note, however, that the total duration of the delay can be predicted. For instance, when referring to certain examples discussed above, the total duration of the delay is the sum of the two-way communication delay and the delay in selecting the object and calculating the pertinent object data.

Note that the total duration of the delay may be predicted by the operator, or calculated automatically, bearing in mind that the parameters that affect the duration of the delay are known and predictable.

Assuming, for the sake of discussion, that the total duration of the delay is about 2 seconds, this means that when the operator views the object he knows that by the time that the object data that he selected will be received and processed in the airborne sub-system (e.g. 401 as discussed in detail above), the location of the object will be substantially 2 seconds ahead compared to the location of the object in the image as selected by the operator. The operator would then be able to estimate the future location of the object in about 2 seconds, e.g. by viewing the motion of the objects in the image received in the ground station and estimate therefrom where would be the expected location of the object within 2 seconds time.

The operator would now be able to provide an estimated future coarse location of the selected object (after 2 seconds or more) and these data can be transmitted to the airborne sub-system. The coarse location can be in the form of e.g. coordinates in the image, expected area, etc.

Note that in accordance with certain other embodiments the total duration of the delay and/or the estimated future coarse location of the object can be determined automatically, using known per se calculations.

Reverting now to the specific embodiment described above, the sensor is directed to open a tracking window that accommodates the estimated future coarse location and acquires a succession of images of the selected area.

Next, images are compared (e.g. by performing known per se operations such as subtraction of an image of the succession from a reference image, or a consecutive image in the succession; or by applying correlation between images, etc.) and in case of difference (exceeding a predefined threshold) this indicates with certain degree of likelihood that the sought object "entered" the tracking window.

Note that due to the fact that the sensor is fitted on direction means such as gimbal mechanism, it may be susceptible to minor fluctuations (due to instability of the gimbal mechanism), with the inevitable consequences that the tracking window receives images which are slightly shifted one with respect to the other, say, for example, one pixel deviation between consecutive images. This deviation between the contents of the images may result in discrepancy between the images (after applying the specified comparison operation) giving rise to false indication that the discrepancy is due to entrance of the object to the tracking window. In order to cope with these undesired fluctuations in the acquired images, known per se image stabilization techniques may be employed, thereby diminishing undue noises that may affect the result of the comparison operation.

For a better understanding of the foregoing, attention is now directed to FIG. 9 illustrating an operational scenario in accordance with an embodiment of the invention. Thus, an airborne unit loiters over a territory (where, in FIG. 9, distinct instances of the airborne unit are shown in different timings T) and a sensor fitted on the sub-system of one of the airborne units acquires succession of images of a ship. Due to the specified delay, by the time that image 11 (with the ship accommodated therein) is received in the ground station (not shown) the ship is already located elsewhere. In accordance with certain embodiments of the invention an estimated coarse future location of the ship is determined (at the ground station), either manually or automatically and the estimated location data (such as coordinates) is transmitted to the airborne unit 901, allowing to place a tracking window (902) accommodating the estimated future location. In accordance with this embodiment, the so acquired images of the area are compared until a difference is encountered (exceeding a certain threshold, for filtering, e.g. noise and other interfering effects, and after applying the stabilization filter discussed above). Having identified a change which exceeds a certain threshold, this suggests that the sought object (903) (or portion thereof) has entered the tracking widow, and if desired an additional procedure may be applied in order to verify that the change is indeed owing to the sought object.

In certain embodiments, the threshold being: changing of values of at least n pixels in the subtracted image. In certain other embodiments the threshold being: changing of values of at least n pixels in the image by at least m value Δ (Δ being for example defined in grey level values).

In certain other embodiments a cluster of pixels whose gray level values were changed, are a prima facie indication that the object of interest has entered the frame.

In accordance with certain embodiments, there is further provided means for identifying said candidate object as the sought object according to at least one following criterion: location of the object, speed of the object, acceleration of the object, size of the object, shape of the object, color of the object. The latter are part of object data calculated, e.g. in the ground station, as discussed with reference to FIG. 4, above.

Once locating the object additional images can be generated for tracking the object. In accordance with certain embodiments, there is further provided payload means (e.g. 408 in FIG. 4) that are controlled in response to the realtime location data of the object. In certain embodiments, with the payload means being kill mechanism, for killing the locked object. An example is a missile mounted on the airborne unit and capable of being launched towards the locked object.

In accordance with certain embodiments the payload being designator means, e.g. laser beam for illuminating the object.

In accordance with certain embodiments the payload means includes data collection means, such as Radar, operating autonomously, or in association with a remote unit (not shown) for collecting data for use in intelligence applications.

Bearing this in mind, a broad aspect of the third aspect of the invention will now be described with reference to FIG. 10:
Receiving data indicative of estimated future coarse location of an object in the scene (1001);
generating a succession of images of an area in the scene, the images includes the estimated coarse location (1002),
comparing between at least two images of said succession, and in the case of difference in at least a portion of respective images that meets a given threshold, the difference is identified as the candidate object (1003).

The present invention has been described with a certain degree of particularity, but those versed in the art will readily appreciate that various alterations and modifications may be carried out, without departing from the scope of the following claims:

The invention claimed is:

1. A method for tracking an object of interest that is embedded within images of a scene, comprising:
   (a) in a sensor unit that includes movable sensor, generating, storing and transmitting over a communication link a succession of images of a scene;
   (b) in a remote control unit, receiving the succession of images;
   (c) receiving a user command for selecting the object of interest in a given image of said received succession of images or derivative thereof, determining object of interest data associated with said object of interest and transmitting through said link to said sensor unit at least said object of interest data;
   (d) in the sensor unit: identifying the given image of the stored succession of images and the object of interest using said object of interest data, and tracking the object of interest in at least one other image of said stored succession of images, said other image being later than said given image;
   (e) in case that said object of interest cannot be located in the latest image of said stored succession of images, using information of at least two images in which said object of interest was located to predict estimated real-time location of the object of interest and generating direction command to the movable sensor for generating real-time image of the scene and locking on said object of interest.

2. The method according to claim 1, further comprising using real-time location data for controlling payload means.

3. The method according to claim 2, wherein said payload means includes a designator for illuminating said object of interest.

4. The method according to claim 2, wherein said payload means includes kill mechanism for killing the locked object of interest.

5. The method according to claim 2, wherein said payload means including data collection device for collecting data in respect of the object of interest.

6. The method according to claim 5, wherein said data is collected for intelligence applications.

7. The method according to claim 1, wherein said at least one other image include at least two images or derivative thereof starting from an image that follows said given image.

8. The method according to claim 7, wherein said at least two images are consecutive from among said succession of images or derivative thereof.

9. The method according to claim 1, wherein said given image being the first image in said succession of received images.

10. The method according to claim 1, wherein said succession of images being a sequence of video frames.

11. The method according to claim 1, wherein said data associated with said object of interest includes indication on said object of interest and at least one of the following: location of the object of interest, speed of the object, acceleration of the object of interest, size of the object of interest, shape of the object of interest, color of the object of interest.

12. The method according to claim 1, wherein said object of interest is in motion and located in different locations in respective images of said succession of images, and wherein said method further comprising: generating a derivative image including freezing an image or slowing down its rate, thereby facilitating the selection of said object of interest as if said object's location in the images was stationary.

13. The method according to claim 12, further comprising: pointing in the vicinity of said object of interest thereby zooming the image according to image boundaries substantially defined by said pointing, and selecting said object by pointing thereto on the zoomed image.

14. The method according to claim 13, further comprising enhancing the image before zooming the object of interest.

15. The method according to claim 1, further comprising identifying said object of interest.

16. The method according to claim 1, whereby said object of interest is located in real-time image, notwithstanding a time delay constituted by a timing difference between a first timing that an image is generated in said sensor and a second timing in which said object of interest is located in the real-time image.

17. A system for tracking an object of interest that is embedded within images in a scene, the system including a sensor unit that includes movable sensor, the sensor unit is configured to generate a succession of images of a scene, a remote control unit configured to communicate with the sensor unit through a communication link and receive through the link at least said succession of images, and in response to selection of the object of interest in an image, transmit through said link object of interest data that pertain to an object of interest that is embedded in images of the scene;
   the system is configured to accomplish substantially real-time location of the object of interest notwithstanding a time delay constituted by a timing difference between a first timing that an image including the object of interest is generated in said sensor and a second timing in which said object of interest is located in real-time image, comprising: in the control unit, determining object of interest data associated with the object of interest in a given image of said received succession of images or derivative thereof, and transmitting through said link to said sensor unit at least said object of interest data; in the sensor unit, identifying the given image of the stored succession of images and the object of interest using said object of interest data, and in the case that the object of interest is not located in the latest image of said succession of images, estimating current location of the object of interest, and generating direction commands to said sensor for generating real-time image and locking on said object of interest.

18. A method for selecting a moving object within images of a scene, for use with the method of claim 1, the method comprising: receiving through a communication link a succession of images; freezing or slowing down a rate of a given image of said succession of images and selecting the object of interest in the frozen given image, as if said object of interest being stationary; determining object data associated with said object of interest and transmitting through said link at least said object data.

* * * * *